US007530028B2

(12) United States Patent
Mulcahy et al.

(10) Patent No.: US 7,530,028 B2
(45) Date of Patent: May 5, 2009

(54) SHARED ONLINE EXPERIENCE ENCAPSULATION SYSTEM AND METHOD

(75) Inventors: Kathleen Mulcahy, Seattle, WA (US); Eun-Kyung Chung, Redmond, WA (US); Geoffrey Elliott, Seattle, WA (US); Heather Ferguson, Centralia, WA (US); Asta Roseway, Redmond, WA (US); Tammy Savage, Seattle, WA (US); Melora Zaner, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 721 days.

(21) Appl. No.: 10/770,794

(22) Filed: Feb. 3, 2004

(65) Prior Publication Data

US 2004/0205091 A1 Oct. 14, 2004

Related U.S. Application Data

(63) Continuation-in-part of application No. 10/230,247, filed on Aug. 28, 2002, now Pat. No. 7,234,117.

(51) Int. Cl.
*G06F 3/048* (2006.01)
*G06F 3/00* (2006.01)

(52) U.S. Cl. .................. 715/772; 715/753; 715/759; 715/706

(58) Field of Classification Search ................ 715/753, 715/759, 772, 758, 751, 835, 706; 345/473
See application file for complete search history.

(56) References Cited

U.S. PATENT DOCUMENTS 5,544,295 A * 8/1996 Capps ........................ 345/473

| 5,880,731 | A  | * | 3/1999  | Liles et al. ................. 715/758 |
| 6,078,948 | A  |   | 6/2000  | Podgorny et al. |
| 6,237,025 | B1 |   | 5/2001  | Ludwig et al. |
| 6,484,196 | B1 | * | 11/2002 | Maurille .................... 709/206 |
| 6,539,421 | B1 | * | 3/2003  | Appelman et al. ......... 709/206 |
| 6,745,178 | B1 |   | 6/2004  | Emens et al. |
| 6,971,086 | B2 | * | 11/2005 | Reddy et al. ............... 717/109 |

(Continued)

FOREIGN PATENT DOCUMENTS

GB 2 345 268 A 2/2003
WO WO 01/20450 A1 3/2001

OTHER PUBLICATIONS

Bouvin, "Designing User Interfaces for Collaborative Web-Based Open Hypermedia," in *Proceedings of the Eleventh ACM Conference on Hypertext and Hypermedia*, pp. 230-231 (San Antonio, TX, 2000).

(Continued)

*Primary Examiner*—Ting Zhou
(74) *Attorney, Agent, or Firm*—Lee & Hayes, PLLC (57) ABSTRACT

A novel technique enables participants of an online group interaction to capture and encapsulate an ongoing activity at a particular moment in time. During the online group interaction, a user activates an icon, and is enabled to select properties of the saved memory, such as icon color/image for the saved material, what parts of the shared experience to save, etc. For example, the user may want to save all or some of the conversation, music played, scores for a game played, and the pictures viewed during the session, as well as any other portion desired. The saved material may represent a snapshot of the activity at save time, or may comprise a sequence of events up to the point that the material was saved. While saving the selected material, the application displays an animation such as an origami-type animation of a box folding up from a flat sheet.

22 Claims, 10 Drawing Sheets

U.S. PATENT DOCUMENTS

| | | | | |
|---|---|---|---|---|
| 2001/0048484 | A1* | 12/2001 | Tamir et al. | 348/589 |
| 2002/0097267 | A1 | 7/2002 | Dinan et al. | |
| 2002/0143989 | A1 | 10/2002 | Huitema et al. | |
| 2003/0055892 | A1 | 3/2003 | Huitema et al. | |
| 2003/0097408 | A1* | 5/2003 | Kageyama et al. | 709/205 |
| 2003/0210265 | A1* | 11/2003 | Haimberg | 345/758 |
| 2004/0111423 | A1 | 6/2004 | Irving et al. | |
| 2004/0128356 | A1* | 7/2004 | Bernstein et al. | 709/206 |
| 2004/0143603 | A1 | 7/2004 | Kaufmann et al. | |
| 2004/0184445 | A1 | 9/2004 | Burne | |

OTHER PUBLICATIONS

Boyer et al., "Virtual Social Clubs: Meeting Places for the Internet Community," *IEEE International Conference on Multimedia Computing and Systems*, pp. 297-301 (Florence, Italy, Jun. 7-11, 1999).

Cugola et al., "Peer-to-Peer for Collaborative Applications," *in Proceedings of the 22nd International Conference on Distributed Computing Systems Workshops (ICDS'02)*, pp. 359-364 (Vienna, Austria, Jul. 2-5, 2002).

Dorohonceanu et al., "A Desktop Design for Synchronous Collaboration," *in Proceedings of the Graphics Interface '99 (GI'99)*, pp. 27-35 (Kingston, Ontario, Canada, Jun. 1999).

Duhr, "Oberflächenelemente in interaktiven und kooperativen anwendungen," Universität Oldenburg, Department of Information Systems Thesis (Aug. 2000).

García et al., "Extending a Collaborative Architecture to Support Emotional Awareness," *EBAA '99—Workshop on Emotion-Based Agent Architectures*, pp. 46-52 (May 2, 1999).

Greenberg et al., "Using a Room Metaphor to Ease Transitions in Groupware," University of Calgary, Department of Computer Science, *Research Report 98/61/02*, 31 pages (1998).

Greenberg, "Collaborative Interfaces for the Web," *in Human Factors and Web Development*, (Forsythe et al., eds.) Chapter 18, pp. 241-253, LEA Press, (1997).

Gutwin, "Workspace Awareness in Real-Time Distributed Groupware," The University of Calgary, Department of Computer Science, Ph.D. Thesis, 270 pages (Dec. 1997).

Kindberg, "Mushroom: A Framework for Collaboration and Interaction Across the Internet," *in Proceedings of the Fifth ERCIM Workshop on CSCW and the Web* (St. Augustin, Germany, Feb. 1996).

Lee et al., "Supporting Multi-User, Multi-Applet Workspaces in CBE," *In Proceedings of the ACM 1996 Conference on Computer Supported Cooperative Work*, pp. 344-353 (Cambridge, MA, 1996).

Schmidt et al., "A Generic System for Web-Based Group Interaction," *in Proceedings of the Thirty-First Hawaii International Conference on System Sciences*, vol. I, pp. 545-554 (Kohala Coast, HI, Jan. 6-9, 1998).

"IBM Lotus Instant Messaging and Web Conferencing," IBM Software—IBM Lotus Instant Messaging and Web Conferencing home page (3 pgs.).

"Design Exploration," *IBM Research: Social Computing Group* (4 pgs.).

"At What Cost Pervasive ? A Social Computing View of Mobile Computing Systems," *IBM Research*: vol. 38, No. 4, 1999, *Pervasive Computing* (28 pgs.).

Smith, Marc A., et al., "The Social Life of Small Graphical Chat Spaces," *In Proceedings of CHI 2000*, The Hague, Netherlands, http://research.microsoft.com/scg/papers/vchatchi2000.pdf (Mar. 2000) pp. 1-8.

Cheng, Lili, et al., "Hutchworld: Lessons Learned. A Collaborative Project: Fred Hutchsinson Cancer Research Center & Microsoft Research," *In Proceedings of Virtual Worlds Conference 2000*, Paris, France, http://research.microsoft.com/scg/papers/hutchvw2000.pdf. (Jun. 2000) pp. 1-12.

Kollock, Peter, "The Economies of Online Cooperation: Gifts and Public Goods in Cyberspace," *Communities in Cyberspace*, 1998 http://www.sscnet.ucla.edu/soc/faculty/kollock/papers/economies.htm, pp. 1-17.

Kollock, Peter, et al., "Managing The Virtual Commons: Cooperation and Conflict in Computer Communities," *University of California, Los Angeles*, http://research.microsoft.com/scg/papers/KollockCommons.htm (1996) pp. 1-20.

Smith, Marc, et al., "What Do People Do in Virtual Worlds? An Analysis of V-Chat Log File Data," *University of California, Los Angeles*, http://research.microsoft.com/scg/papers/kollockv-chat.pdf (1998) pp. 1-30.

Farnham, Shelly, et al., "Supporting Sociability In A Shared Browser," *In Proceedings of Interact Conference*, Tokyo, Japan, http://research.microsoft.com/scg/papers/sharedbrowsinginteract.pdf (Jul. 2001) pp. 1-8.

* cited by examiner

SHARED ONLINE EXPERIENCE ENCAPSULATION SYSTEM AND METHOD

RELATED APPLICATION

This application is related to and claims priority to copending U.S. patent application Ser. No. 10/230,247, entitled System And Method For Shared Integrated Online Social Interaction, filed Aug. 28, 2002, of which the present application is a continuation-in-part, and which is herein incorporated by reference in its entirety for all that it teaches without exclusion.

FIELD OF THE INVENTION

This invention relates generally to online group interactions over a network and, more particularly, relates to a system and method for saving a state or series of events related to an online group interaction.

BACKGROUND

As computers and computer networks become increasingly common, individuals spend a greater amount of time and energy performing everyday tasks via their computers. For example, business discussions and interactions are increasingly taking place over networks rather than in-person. Similarly, educational institutions increasingly employ computers and computer networks to replace or supplement traditional teaching methods. Moreover, with respect to leisure activities, many computer users employ their computer for entertainment, to engage their peers, and to be a part of a community.

One example of an online group interaction application is given in copending U.S. patent application Ser. No. 10/230,247, entitled System And Method For Shared Integrated Online Social Interaction, filed Aug. 28, 2002, which is herein incorporated by reference in its entirety for all that it teaches without exclusion. Typically, a user accesses the group interaction application via a desktop icon on their computer. Through the application, the user has immediate interactive access to a group of online friends. A number of activities can be shared among the members of the group. For example, group members may share photographs and comments thereon or additions thereto. Group members can also share an audio experience, such as listening to a recitation or recording of interest. Other shared activities are possible as well. Although the present description will focus primarily on certain activities, it will be understood that the disclosed principles are applicable to other types of activities, including but not limited to those described in the copending application identified above.

During a shared activity, the group interaction application ensures that each online member sees the same representation of the shared activity as additions and changes are made. One mechanism for synchronizing the presentation of each member is a peer-to-peer network, although other connection mechanisms, including those with centralized switching or storage, are also usable.

With respect to traditional person-to-person shared activities, such as an outing to a concert or a party, participants often take and keep souvenirs or keepsakes to later remind them of the activity and evoke pleasant memories. For example, a person may keep ticket stubs or a program from a concert that they attended with their friends. In the online world, this type of continuity is often missing. That is, although group members may have a very good connection with their peers at a given moment, their sense of history and their ability to tangibly reference past shared experiences are not as keen as in the physical world.

BRIEF SUMMARY OF THE INVENTION

The present invention is directed to a technique for enabling participants of an online group interaction to capture and encapsulate a moment in time out of the ongoing interaction. In particular, during an online group interaction, a user may activate an icon or otherwise indicate a desire to capture the moment for later enjoyment. In response, the user is shown a dialog box that allows the user to select properties of the saved memory, such as icon color and image to associate with the saved material, as well as what portion or portions of ongoing activities to save. Thus, the user can capture one or more activities at once, creating a "mixed media" memory cube. For example, the memory cube can capture photos, along with an audio mix and the group's text conversation as a way to "re-live" the experience or share with others as a group-created "gift." In various embodiments of the invention, the saved material may comprise a snapshot of the activity at the point when the material was saved or, in an embodiment of the invention, may comprise a sequence of events up to the point that the material was saved.

In an embodiment of the invention, while saving the material from the group interaction activity, the application displays to the user an animation. In a further embodiment of the invention, the animation is related to closing or enclosing, and may comprise, for example, an origami-type animation of a box folding up, and so on.

The file format for the saved material may be executable or data. In the former case, the file includes a viewer that is activated when the file icon is activated. In the latter case, the file is merely associated with or linked to such a viewer. The cube may be opened and viewed by one user, typically the saving user, or may be viewed with a group online, such as the group that was involved in the cubed activity.

During playback of the cube contents, users can observe which users initiated which actions during the session (and this information is thus saved previously as part of the cube). For example, during playback of an interactive video viewing session, it may be desirable to see which user made what comment regarding the video, or which user tossed a "virtual tomato" at the video.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

The invention pertains to online group interaction over a computer network and to a novel system and method for encapsulating memories from online interaction sessions and events. The invention thus operates in a computer environment. In an embodiment of the invention, the described process operates on a collection of one or more computing devices. A suitable computing device usable in implementing all or some aspects of the invention will be first described with references to FIG. 1, after which a network environment according to particular embodiments of the invention will be more fully described.

Although there are many computing devices suitable for implementing the invention, several exemplary types of computing devices are discussed below with respect to FIG. 1. It will be appreciated that this explanation is given for ease of understanding and is not intended to limit the scope of the invention.

Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, cell phones, and the like. The invention may be practiced in distributed computing environments where tasks are performed by remote processing devices that are linked through a communications network. In a distributed computing environment, program modules may be located in both local and remote memory storage devices.

Figure 1:
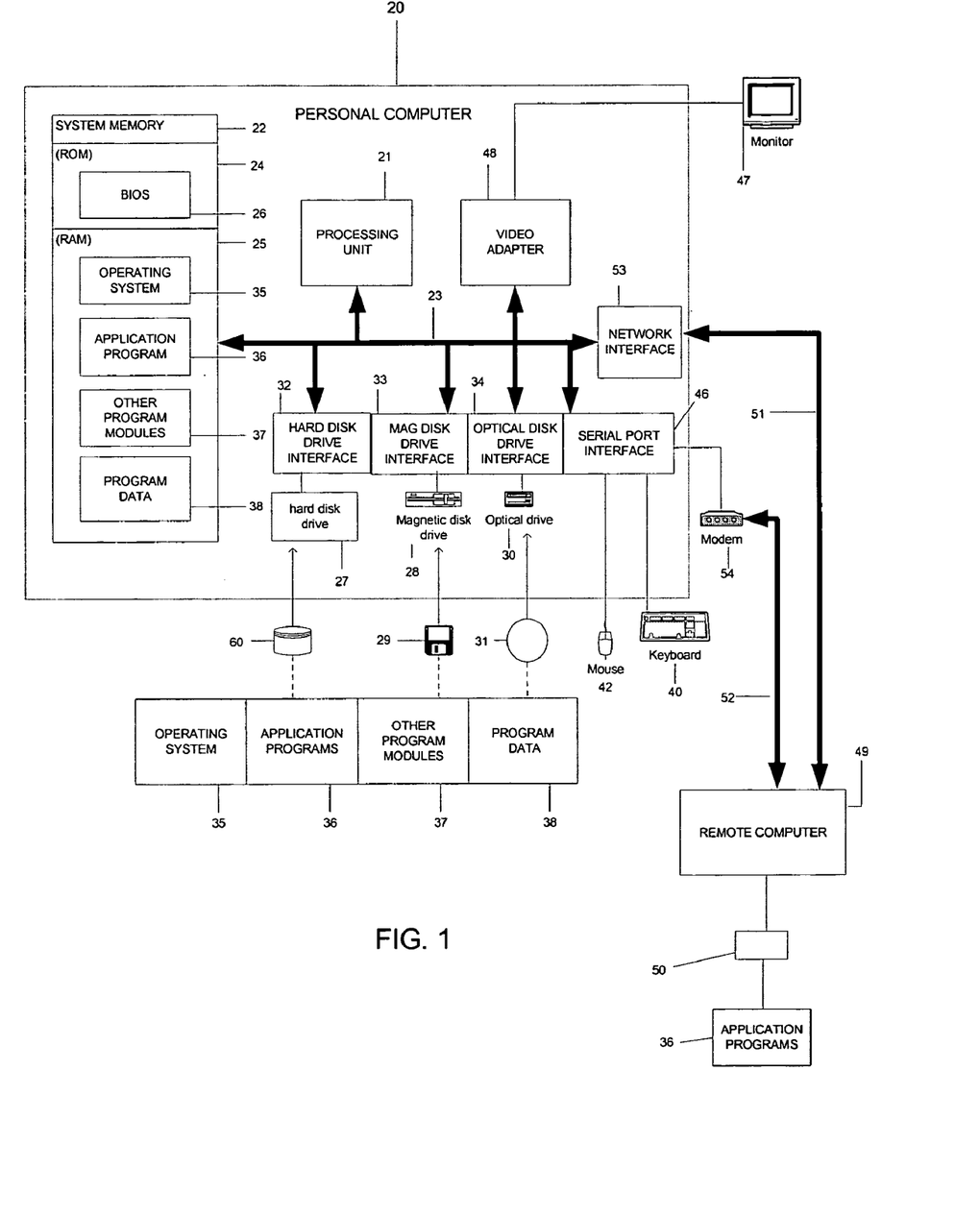
FIG. 1 is a block diagram generally illustrating an example device architecture in which all or a part of embodiments of the present invention may be implemented.

Turning now to FIG. 1, a general purpose computing device is shown in the form of a conventional computer 20, including a processing unit 21, a system memory 22, and a system bus 23 that couples various system components including the system memory to the processing unit 21. The system bus 23 comprises one or more physical busses of any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment. A number of program modules may be stored on the hard disk 60, magnetic disk 29, optical disk 31, ROM 24 or RAM 25, including an operating system 35, one or more applications programs 36, other program modules 37, and program data 38.

A user may enter commands and information into the computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, computers may include other peripheral output devices, not shown, such as speakers and printers.

The computer 20 operates in a networked environment using logical connections to one or more remote computers, such as a remote computer 49. The remote computer 49 may be a domain controller, server, a router, a network PC, a personal computer, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the WAN 52. The modem 54, which may be internal or external, is connected to the system bus 23 via the serial port interface 46. Program modules depicted relative to the computer 20, or portions thereof, may be stored in the remote memory storage device if such is present. It will be appreciated that the network connections shown are exemplary and other means of establishing a communications link between the computers may be used.

Herein, the invention will generally be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various acts and operations described hereinafter may also be implemented in hardware. In the following discussion, computing devices such as clients, domain controllers, servers, and so on may be of the architecture as described above with respect to FIG. 1 regarding computer 20 and/or remote computer 49, or may alternatively have any other type of architecture.

Figure 2:
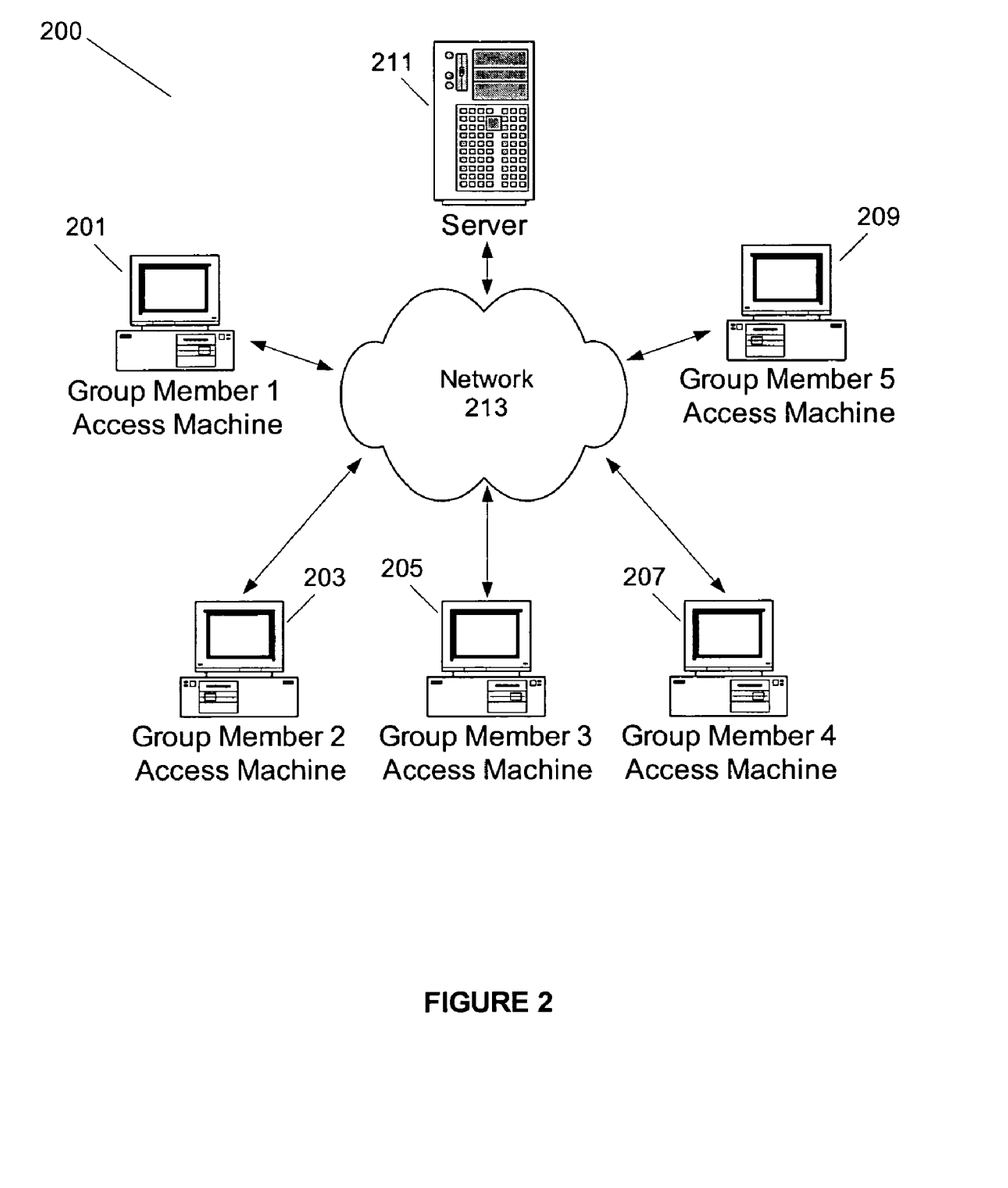
FIG. 2 is a network diagram of an architecture for implementing an embodiment of the invention.

FIG. 2 illustrates in schematic form a network architecture 200 for implementing particular embodiments of the invention, although other embodiment of the invention are not excluded. A number of user computers are identified as Group Member 1 Access Machine (201), Group Member 2 Access Machine (203), Group Member 3 Access Machine (205), Group Member 4 Access Machine (207), and Group Member 5 Access Machine (209). The user computers 201, 203, 205, 207, 209 are illustrated as connected or connectable to each other via network 213.

The computers 201, 203, 205, 207, 209 are used by individual users to interact with other individual users of other ones of the computers 201, 203, 205, 207, 209. Typically, each computer 201, 203, 205, 207, 209 will have running thereon a group interaction application usable to display a representation of a group interaction space, as will be discussed in greater detail below, and to update that representation or the representations on other user machines via the network 213. The group interaction application also exposes ways in which the user can interact with the rest of the online group, such as by adding or modifying content, annotating content, communicating with other members, etc.

In addition to the aforementioned components, a server computer 211 is connected or connectable to network 213 in an embodiment of the invention, although it is excluded in an alternative embodiment of the invention. One purpose of the server computer 211, when used, is to store the state of the group, e.g., networking data, membership data, etc., and/or to store group data, e.g., shared content, projects, etc. In the alternative embodiment of the invention wherein the server 211 is not used, the network 213 is a peer-to-peer network, with the state of the group and the group data being stored on the member machines 201, 203, 205, 207, 209. Note that although five machines and one server are illustrated, this configuration is simply an example, and any number of machines and/or servers, when used, may be included. Furthermore, although the network is illustrated in a manner often associated with large switched networks, any type of networking technology may be used. Furthermore, in a peer-to-peer network, certain computers may only be able to access other computers by going through an intermediary, which may or may not be one of the group member access machines.

Figure 7:
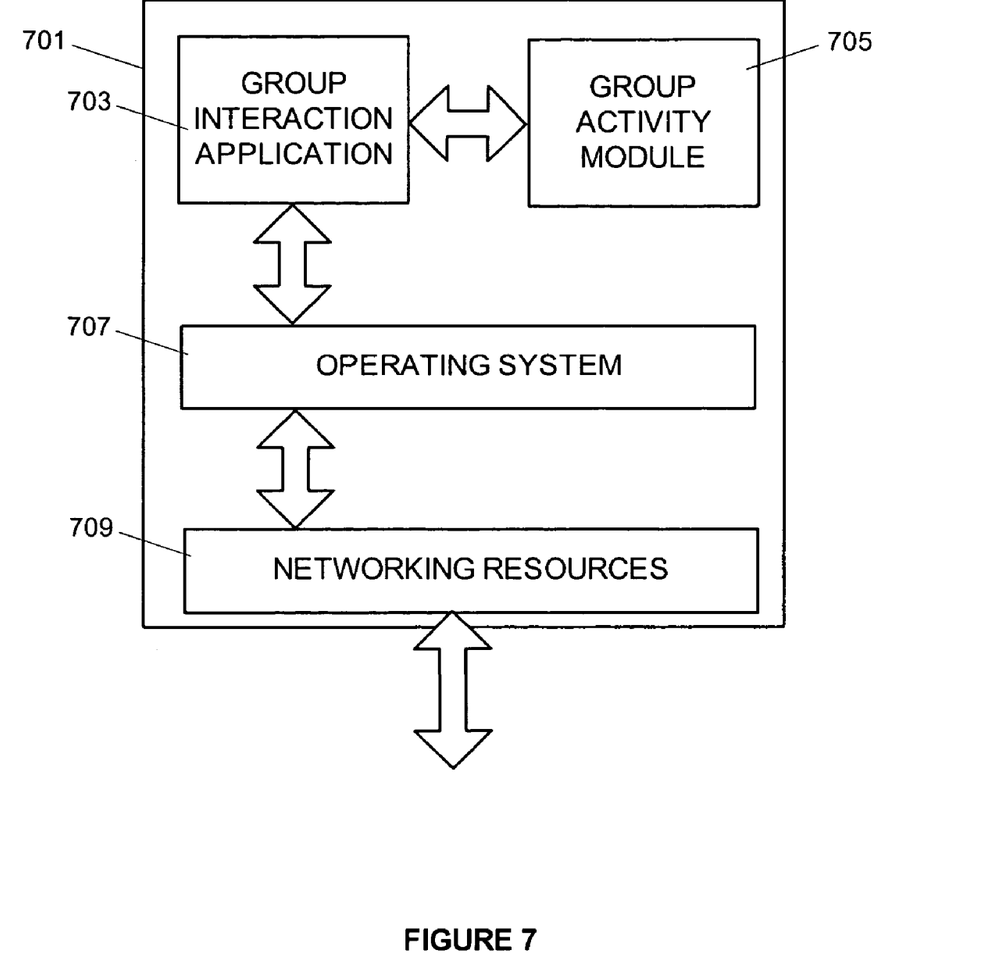
FIG. 7 is a schematic diagram of a group interaction application environment within which an embodiment of the invention may be implemented.

Before discussing the memory cube function in greater detail, a basic computing architecture for the group interaction will be described. Referring to FIG. 7, the group interaction application 703 resides in active computer memory 701 with a group activity module 705, an operating system 707, and networking resources 709 for the computer. The group interaction application 703 interacts with the group activity module 705 to determine what content to display at any given moment to the user of the particular computer. In addition, the group interaction application 703 uses the networking resources 709 via the operating system 707 to communicate with other user machines, such as for sharing data and synchronizing the user views.

Figure 3:
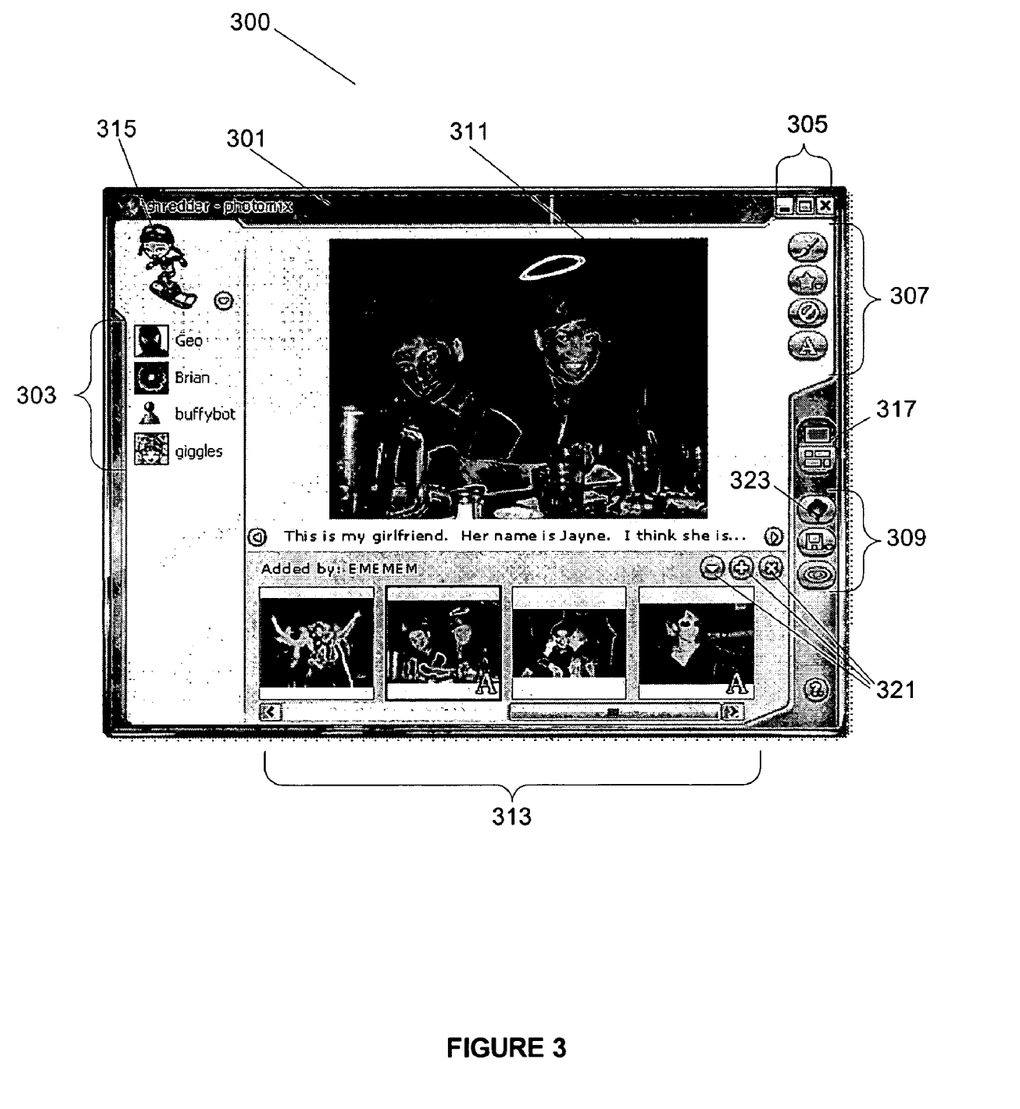
FIG. 3 is an illustration of a user interface usable within an embodiment of the invention.

Referring to FIG. 3, an exemplary group interaction user interface 300 is illustrated. The illustrated user interface 300 pertains to a "Photomix" activity wherein group members view a photograph or photographs provided by one or more group members. Although a great number of different activities can be enjoyed online with a group, the Photomix activity will be used herein to illustrate various features of the user interface 300. By way of example and not limitation, other types of activities include games, video sharing, audio sharing, fantasy leagues, chat, shared drawing or painting, scrapbooking, scheduling, planning, shared browsing, etc.

The interface 300 contains a number of window elements including a menu bar 301 having, for example an activity and/or group name, and a set 305 of graphical window controls (e.g. minimize, maximize, close, as illustrated, and/or others). In addition, the interface 300 comprises a graphical and textual member list 303 that identifies the members of the group that are online and participating in the ongoing Photomix activity. A group icon 315 is displayed to clearly identify what group is involved in the activity. This may important for users who belong to a number of distinct online groups.

A set 307 of annotation tool icons are selectable by the user to invoke various tools or functions for modifying the photograph 311 of interest at a particular point in the activity. For example, such tools allow users to draw on or textually annotate or caption the photograph 311, and to place "stickers," e.g. small pregenerated reusable images, on the photograph 311. A "skin" button 317 is selectable by a user to apply a different "skin," e.g. visual effect, to the interface 300. Users may add and/or delete photographs from the activity and scan through photographs using the appropriate one of the buttons 321 located over the selection of thumbnails 313 of all available photographs.

A further group of selectable icons 309 allows the user to save the ongoing activity in various ways. Of primary interest is a "memory cube" icon 323, which is selectable by the user to save the current state of the activity or a sequence of events leading to the current state depending upon the activity. The operation of the memory cube option will be described in greater detail with reference to FIG. 4 and subsequent figures.

Figure 4:
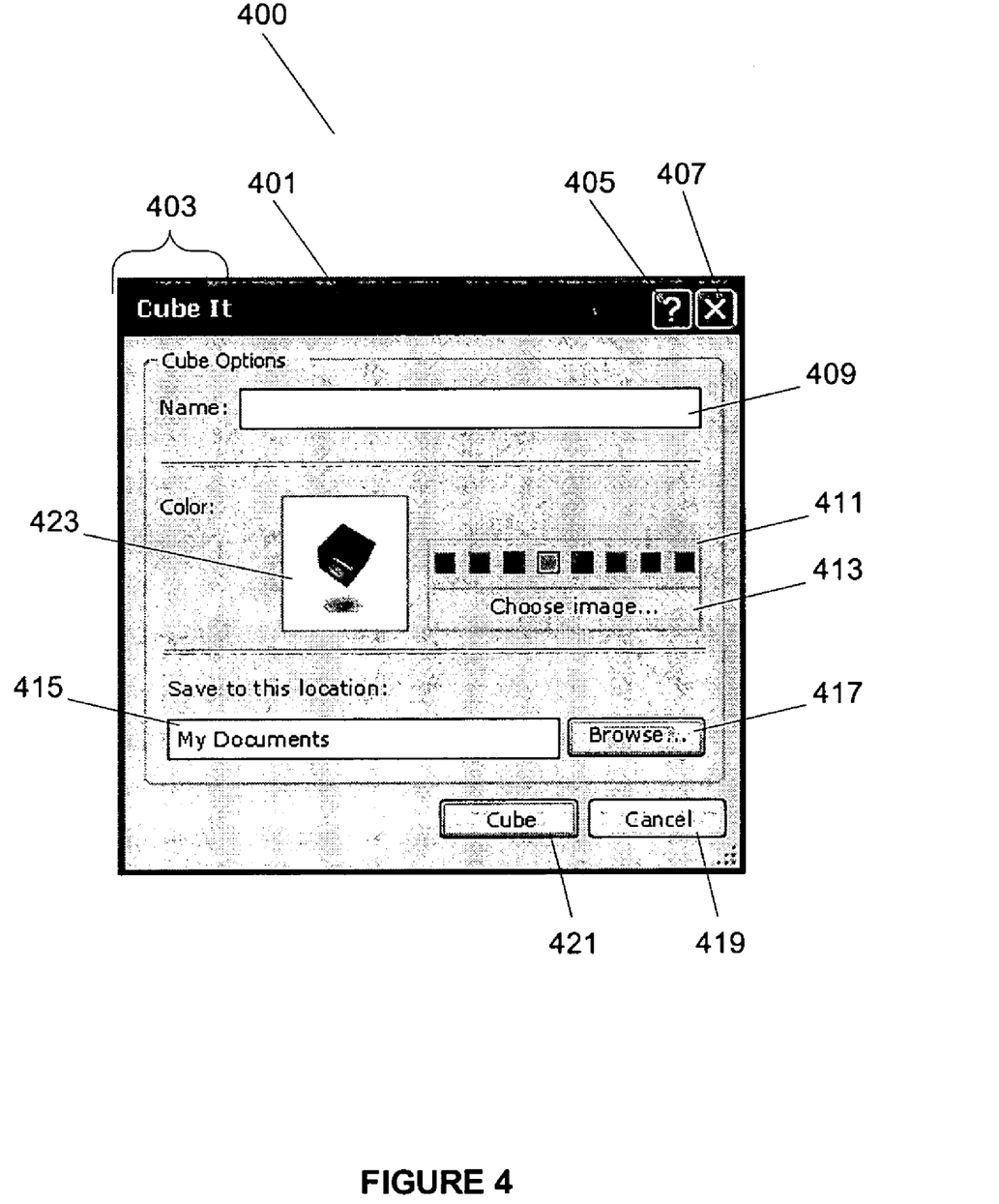
FIG. 4 is an illustration of a user interface usable within an embodiment of the invention for selecting memory cube parameters and saving a memory cube.

FIG. 4 illustrates a user interface dialog box that appears on a particular user's screen when the user has selected the memory cube icon 323, shown in FIG. 3. The user interface dialog box 400 comprises a number of window elements. For example, the dialog box 400 comprises a menu bar 401 having therein an action title, e.g. "Cube It." Any number of other titles may be used, and the terms memory cube and cube it are simply examples. The title bar 401 further comprises a selectable help icon 405 and a close or exit icon 407. As the names imply, the help icon may be selected to obtain automated help regarding the saving function being accessed, etc., while the close icon 407 is usable to close the dialog box 400 entirely.

Other elements of the "Cube It" dialog box 400 include a name field 409 to allow the user to enter a name for the memory cube to be created. The dialog box also allows the user to select a color and image for the memory cube. In particular, color field 411 presents the user with an array of color choices (8 choices in the illustrated example) for selection by the user of a particular color. When selected, image field 413 allows the user to access stored images and choose one with which to wrap the cube. For example, a photograph stored in the user's "my pictures" folder can be used to cover the cube. Any manner of covering is possible, but in an embodiment of the invention, the central portion of the image is placed on the largest visible face of the cube, with the remainder of the image being "wrapped" contiguously onto the other visible faces. Not all of the selected image need be visible when the cube is wrapped. In a further embodiment of the invention, the user is also prompted to, or enabled to, select one or more properties regarding the data to be saved. For example, for space reasons it may be desirable to save only a collage and not separately save each of the component photographs. In yet a further embodiment of the invention, if multiple group interactions are occurring, the user is prompted to select the properties of several activities to be saved. For example, the user may want to save the, Photomix collage, the play list from the shared audio, and a log of the group text conversation for a certain period in time during which they were participating in the Photomix. In this embodiment in which multiple activities or pieces thereof are included in the cube, the user may have the option to select a layout for the cube, e.g., the manner in which the different items are visually organized.

The preview field 423 shows the user a preview of the cube icon to be associated with the saved memory cube with the selected color and image options implemented. In an embodiment of the invention, the preview cube image rotates or otherwise moves to attract the user's attention. In an embodiment of the invention, to be discussed below in greater detail, the icon associated with saved memory is not a cube, but is selected from a number of other possible images. In this embodiment of the invention, another user-selectable image option field, such as a "shape" field may be provided. Alternatively, an assortment of possible icon shapes may appear when the image field 413 is selected. A cancel button 419 allows the user to cancel the memory cube operation without creating a memory cube, for example if the user decides to wait to create a cube later.

Figure 5A:
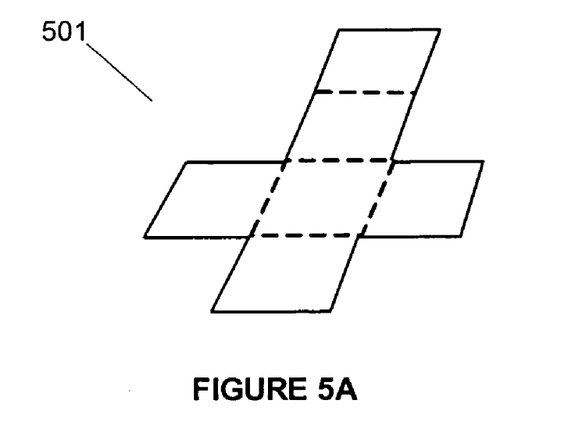
FIGS. 5A-5F are progressive illustrations in time order of a save operation animation according to an embodiment of the invention.
Figure 5B:
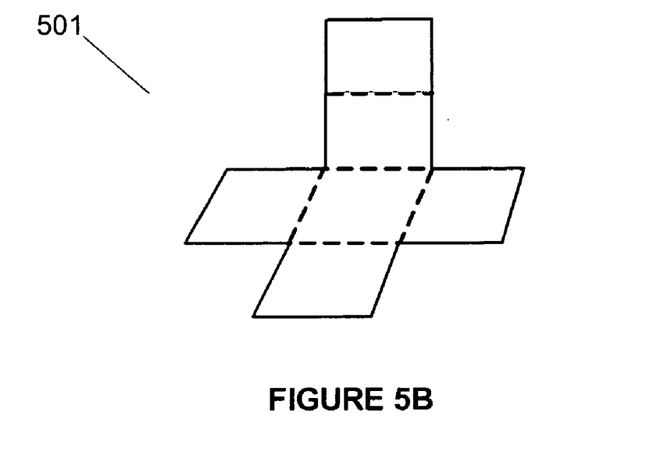
Figure 5C:
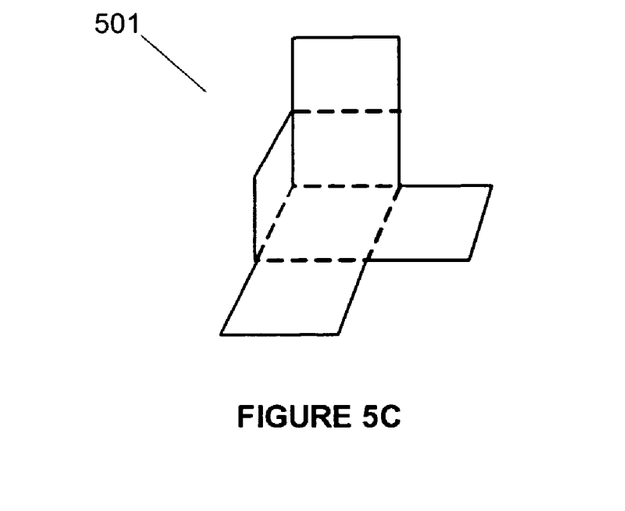
Figure 5D:
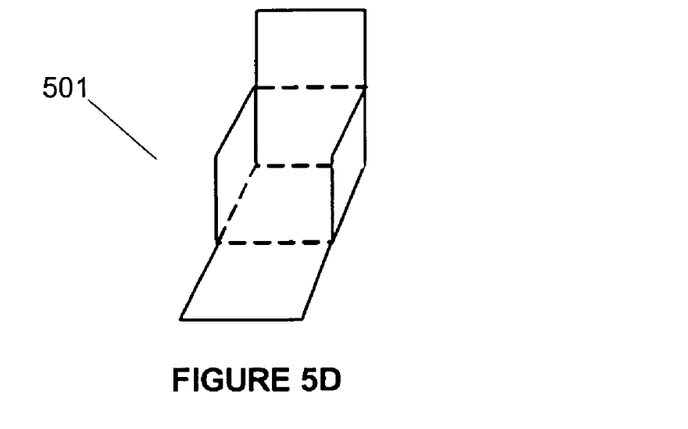
Figure 5E:
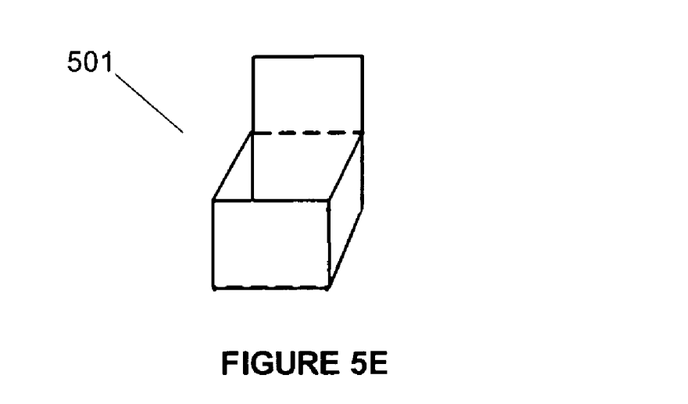
Figure 5F:
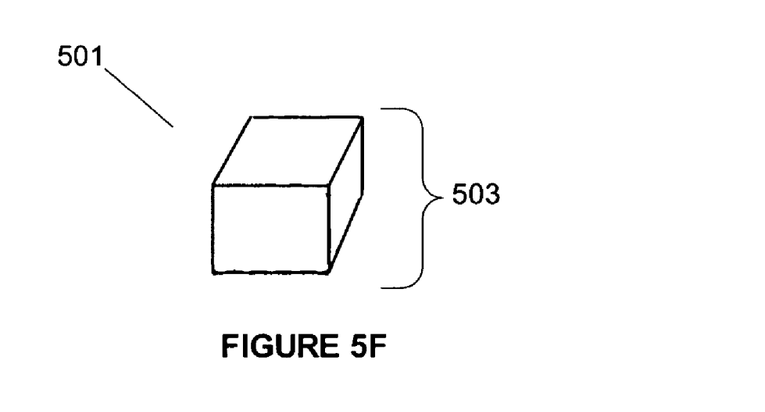

A save button such as the "Cube" button 421 is selectable by the user to create the memory cube. In an embodiment of the invention, an animation is shown during the saving of the memory cube. The animation in a preferred embodiment of the invention shows the closing or folding of a sheet to yield the final shape, e.g. a cube. FIGS. 5A-5F illustrate an exemplary sequence of views of a cube during the saving animation. In FIG. 5A, an unfolded sheet 501 is illustrated. In each of FIGS. 5B-5F, the sheet is progressively folded until it forms a cube 503. This example shows just one of many possible animations that may be shown during the save operation in an embodiment of the invention. For example, a sheet may be folded into any other shape, such as a dragon, envelope, etc. Moreover, other types of animation may be used, such as a closing clamshell or jewelry box, and so on without limitation.

The memory cube may be saved as a stand-alone entity or as a data file that is used in conjunction with a viewer. If the memory cube is saved as a stand-alone entity, this allows the cube to be given to and viewed by any other user regardless of whether that user has a memory cube viewer or not. In this case, the saved memory cube includes a copy of a memory cube viewer that is preferably automatically invoked when the memory cube icon is activated, such as by double-clicking. This mode of storage incurs greater storage and transmission costs since the viewer will be stored and transmitted along with the actual data. If the memory cube is saved as a data-only file, then any user to whom the cube is later given must either have or acquire a memory cube viewer before they can view the memory cube. In this latter case as well, the viewer is preferably located and automatically invoked to open and display the memory cube data when the memory cube icon is activated. In an embodiment of the invention, a local or remote copy of the viewer is automatically located and retrieved using existing operating system functionality for matching files to appropriate applications, as will be appreciated by those of skill in the art.

In an embodiment of the invention, the memory cube is not editable via the cube viewer. In this way, the spontaneity of the captured moment will not be later lost in attempts to perfect the cube contents. In an alternative although less preferred embodiment of the invention, the cube contents are editable via the cube viewer.

The exact contents of the memory cube depend, in an embodiment of the invention, on the type of activities being cubed. That is, for some activities a snap-shot or instantaneous view of the activity suffices, whereas for other types of activities, the sequence of events leading up to a particular moment are important as well to convey the feeling of the moment. For example, for a photo sharing activity, e.g. Photomix, the result of the sharing session rather than the process of the sharing session may be more important to a user. However, for an interactive video viewing experience, wherein users can react to, annotate and comment on a video as it plays, it may be important to users to save the entire sequence of events. For example, the memory cube for such an activity may capture all or some of the video and accompanying user annotations etc. at the appropriate times. In addition, it is desirable to save with the cube an indication of which user initiated which action during the session. For example, during playback of an interactive video viewing session, it may be desirable to see which user made what observation regarding the video, such as by tossing a "virtual tomato" at the video or making a textual or audio comment.

A particular embodiment of the invention saves a Photomix activity in a unique manner. The save operation, executed either by the group interaction application or a photo activity module, creates a file with all photographs in the space including any stickers, drawing, text, etc. and the collage, if any. The photographs and collage are viewable when the memory cube is opened for viewing. In an embodiment of the invention, the first image shown is the collage, if one was made. The remaining photographs are preferably presented in the same order that they were presented in the Photomix activity. In an embodiment of the invention, the skin that was used in the activity at the time that the memory cube was created is also saved as part of the cube.

In a further embodiment of the invention the memory cube file has a unique file format, such as a format specified by a .mem file name extension. Note that within the memory cube file, media items such as pictures, videos, and audio segments may be encoded by traditional means. For example, techniques for JPEG, MPEG, TIFF, and GIF coding may be used. In an embodiment of the invention, the memory cube file, when opened, references other files external to itself to complete the presentation. For example, the memory cube file may comprise a listing of external media files and a specification of how those files should be presented.

Figure 6A:
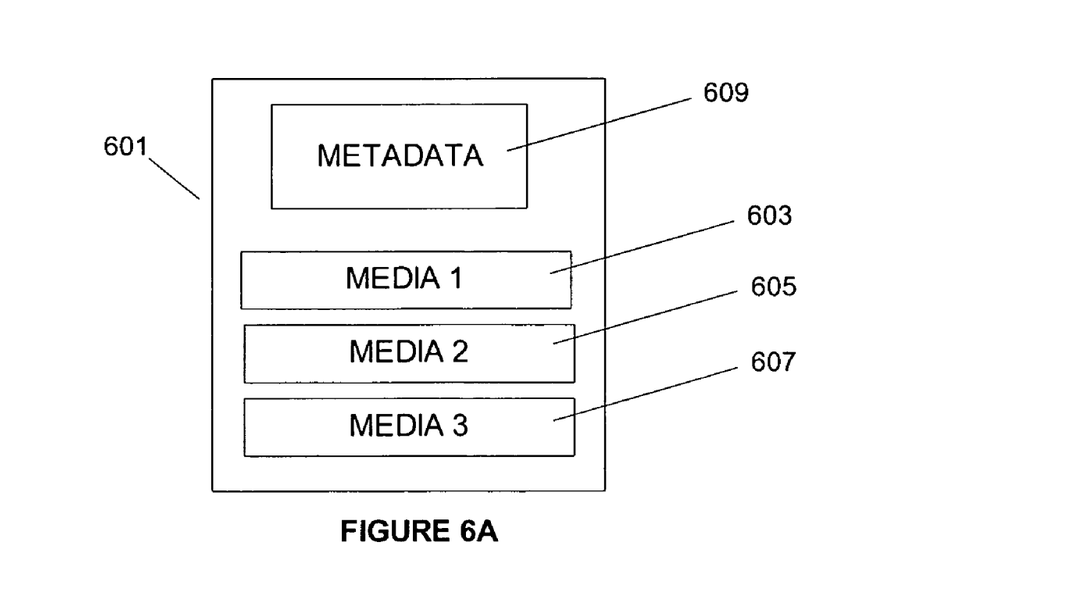
FIG. 6A is a schematic illustration of a memory cube file architecture according to an embodiment of the invention.

FIGS. 6A and 6B schematically illustrate two different memory cube file types within particular respective embodiments of the invention. In the structure shown in FIG. 6A, the memory cube file 601 incorporates several sets of media information 603, 605, 607. The file 601 additionally comprises descriptive data, or metadata, 609 that describes the way in which the memory cube viewer should present the media information. For example, the media information 603, 605, 607 may be photographs, and the metadata 609 may describe the order, etc., of the photographs during the group activity from which the cube file was created.

Figure 6B:
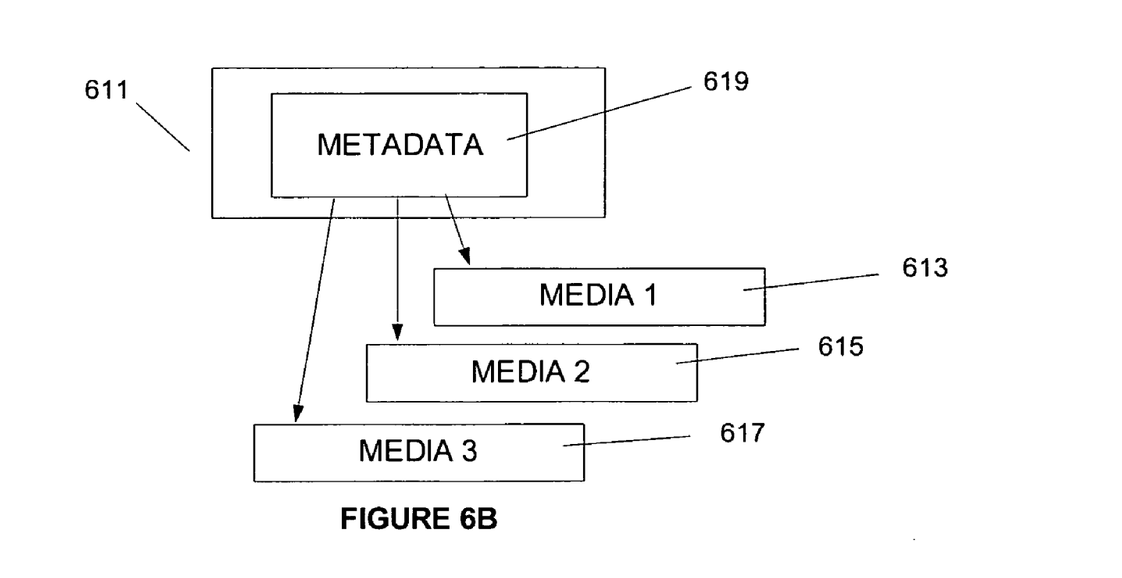
FIG. 6B is a schematic illustration of a memory cube file architecture according to an alternative embodiment of the invention.

In the embodiment of the invention illustrated in FIG. 6B, the memory cube file 611 comprises little or no media data, but does incorporate metadata that identifies one or more external media files 613, 615, 617. With respect to FIGS. 6A and 6B, it will be appreciated that as described above the memory cube file 601, 611 may also either comprise the memory cube viewer or a link or pointer to such, or may not in an embodiment of the invention.

In any case, whether the memory cube is stored as a single file or multiple files, and whether the memory cube is executable or non-executable, any suitable technique for storage and play back of such files can be employed as will be appreciated by those of skill in the art. Example mechanisms for storage and play back are discussed in greater detail below. In an embodiment of the invention, when a user elects to create a memory cube, the user may, as described elsewhere herein, either select particular activities to cube, or may cube the entire activity. In either case, the following simple rules can be used to determine what data and metadata to save, although any other suitable rules could be used instead.

If the material to be saved includes video material, then the data corresponding to the video is saved in a format corresponding to any of a variety of video encoding standards or protocols, such as MPEG or otherwise. If the material to be saved includes still graphical material such as a photograph or picture, then the data is saved in a format corresponding to any of a variety of picture encoding standards or protocols such as JPEG, TIFF, etc. If the material to be saved includes audio material such as a prerecorded segment or an audio comment or discussion, then the data is saved in a format corresponding to any of a variety of audio encoding standards or protocols, such as MP3, PWM, compressed or uncompressed, (CELP, ACELP, etc. for speech files if desired) etc. Finally, for textual material, the data should be saved in a format corresponding to any of a variety of text or picture encoding standards, protocols or file formats, such as JPEG, TIFF, .txt, .rtf, etc. The foregoing discussion is not intended to be limiting, and it will be appreciated that although "file" formats are discussed, the memory cube contents may not be stored as separate files. For example, a single file or collection of data, internal or external to the cube file, could contain information representative of media data of several different types.

As will be described in greater detail below, the timing, order of presentation, and/or spatial arrangement of media items are preferably described in the metadata of the cube. For example, a comment (audio, textual, and/or graphical, etc.) made during a video is preferably replayed at the same time in the video as it was originally made, as described by the metadata. As another example, the order of pictures in a photo sharing session and the placement of pictures or other graphical items in a collage are recorded as metadata. In an embodiment of the invention wherein only selected portions of the ongoing activity(s) are saved, the metadata of the cube preferably only includes metadata related to the saved portions.

In an embodiment of the invention, the aspects or "events" of the ongoing activity are preemptively saved in memory during the activity, so that a request at some point in the activity to cube the activity causes the pre-stored information to be saved to a cube file(s), preferably without being erased or overwritten. With respect to determining the time period to save, the user may be presented with a graphically selectable indicator of the temporal period to be saved at the same time that the user selects which portion(s) of the activity to save.

As noted, the memory cube file is either executable or non-executable. With respect to either, those of skill in the art will appreciate the many known ways in which a non-executable file is associated with an appropriate playback application, and in which execution of an executable file is automatically begun upon invocation thereof, such as by selection of the associated icon.

Figure 8:
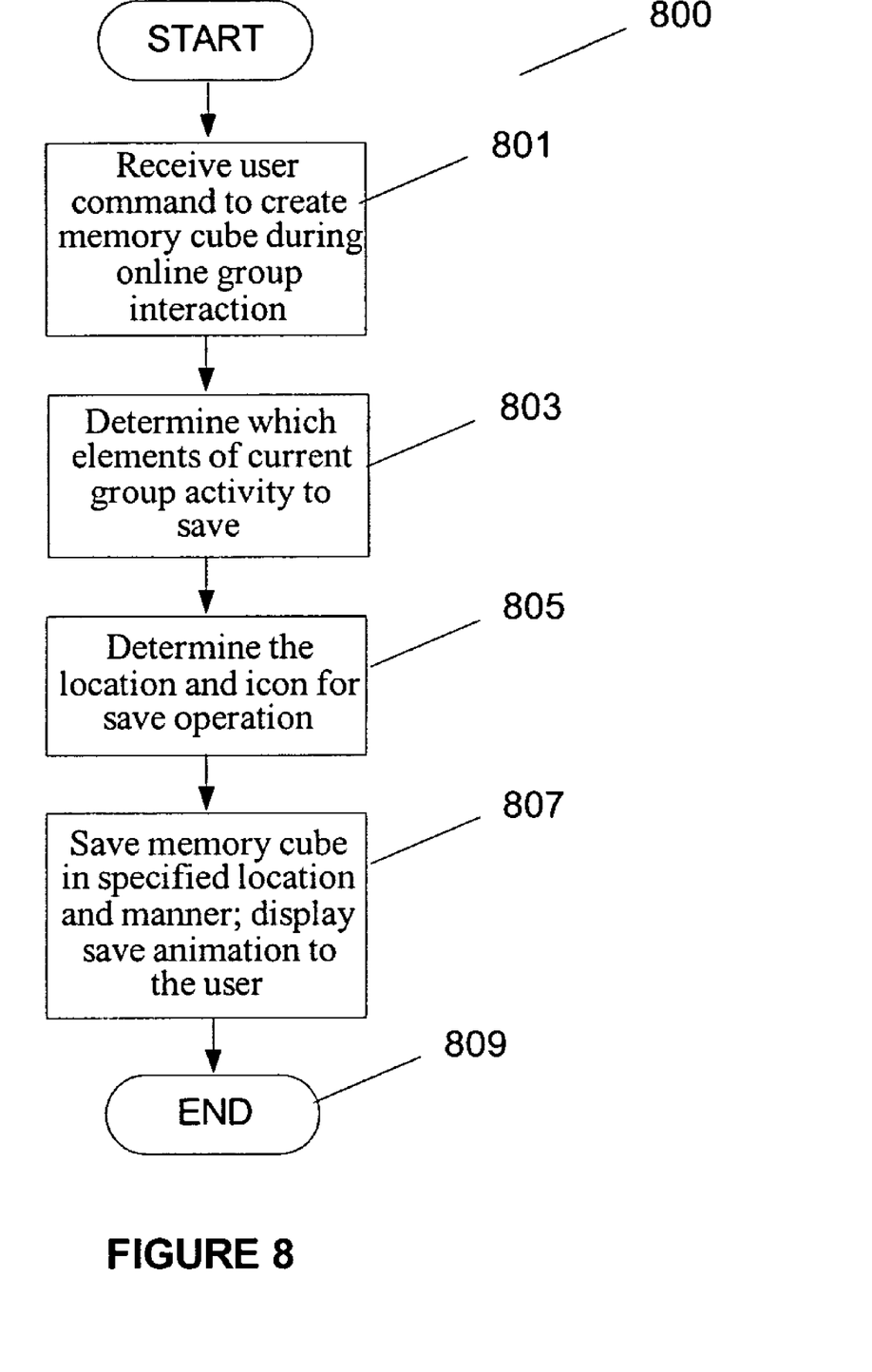
FIG. 8 is a flow chart showing steps to create a memory cube according to an embodiment of the invention.
Figure 9:
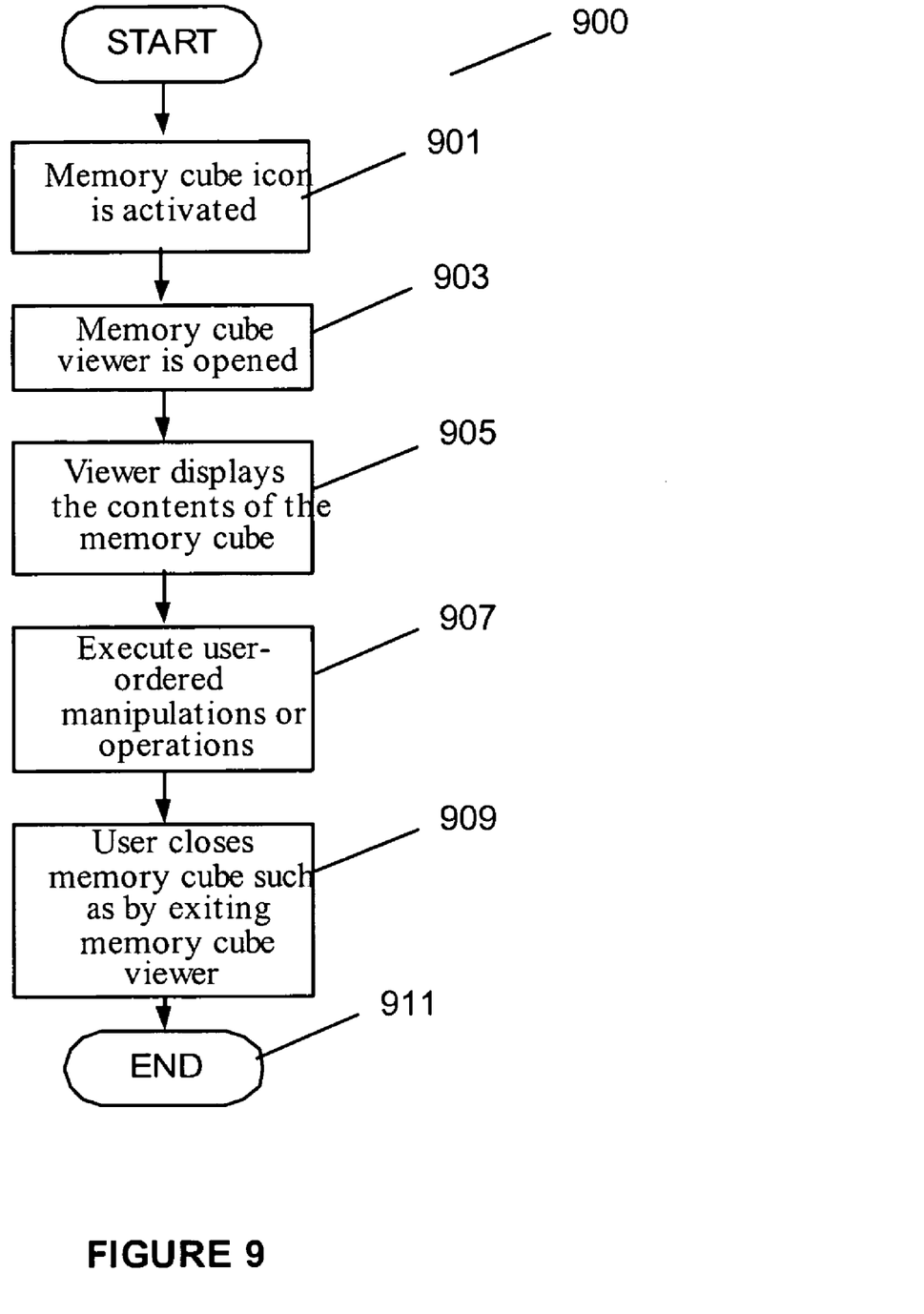
FIG. 9 is a flow chart showing steps to access a memory cube according to an embodiment of the invention.

FIGS. 8 and 9 illustrate steps within an embodiment of the invention to create and access a memory cube. As shown in the flow chart 800 of FIG. 8, the process of creating a memory cube begins at step 801 by receiving a user command at the group interaction application to create a cube during an online group interaction. At step 803 the group interaction application determines what elements of each current group activity to save (i.e. photographs, collage, order of presentation). As noted above, in an embodiment of the invention, while one or more activities are occurring, the group interaction application maintains an in-memory log of the "events" that occur, and a user may select which activities or portions of activities to save to the memory cube. At step 805 the application determines the location and icon for saving. With respect to step 805, the save location, icon shape and color, etc., may be specified by the user as discussed above.

At step 807, the application saves the memory cube in the specified location and manner, while simultaneously displaying to the user an animation, such as that of a cube or other container folding, closing, etc. Note that the animation may play for less than the entire save time, precisely the save time, or may extend beyond (before and/or after) the actual save time. In an embodiment of the invention, the progress of the animation is keyed to the progress of the save operation. For example, when the save operation is half completed, the animation may be approximately halfway finished.

When cubed, the in-memory log of events is persisted, in an embodiment of the invention, as XML as in the following example, which describes a video activity wherein an animated "thrown tomato" comment is contributed:

```
<cube>
    <activity id="flix">
        <event time="1"contributor="jsmith">
            <add-video>somevideo.wmv</add-video>
        </event>
        <event time="5" contributor=" jsmith">
            <playstate-change>play</playstate-change>
        </event>
        <event time="30000" contributor="jdoe">
            <throw position="30,30">tomato</throw>
        </event>
    </activity>
</cube>
```

The XML describes the time (in milliseconds) since the activity was started that the event (i.e. the throw) occurred (time=""), the position for the event, and the person who performed that event (contributor=""). That data specific to each event is stored as a subitem (add-video, playstate-change, throw) that can contain it's own metadata. For example, the add-video item contains the name of the file added, and the throw item contains the position and item to be thrown.

As noted above, multiple activities can exist in the same cube. The XML description within a multiple activity memory cube may be as in the following example:

```
<cube>
    <activity id="flix">
        <event time="1"contributor="jsmith">
            <add-video>somevideo.wmv</add-video>
        </event>
        <event time="5" contributor="jsmith">
            <playtstate-change>play</playstate-change>
        </event>
        <event time="30000" contributor="jdoe">
            <throw position="30,30">tomato</throw>
        </event>
    </activity>
    <activity id="photomix" time="10000" contributor="jdoe">
        <event time="1000" contributor="jdoe">
            <add-photo>somephoto.jpg</add-photo>
        </event>
    </activity>
</cube>
```

This example shows that the first activity (flix) was started, followed by the second activity (photomix), which was started 10 seconds after the flix activity by jdoe. The contributor jdoe added a photo to the photomix 1 second after starting it.

In replay mode for the cube, the user would have the option of viewing the entire cube from beginning-to-end (e.g. the flix opens and starts playing a video, then the photomix opens and the photo is added, then the tomato is thrown on the video) or choosing a particular activity within the cube to watch (e.g. just the photomix). It is possible to have multiple instances of an activity within this structure as well. For example, if the photomix session was closed after 1 minute and a new photomix session was opened later, there would be two <activity id="photomix"> items in the XML.

The XML is persisted to the storage document as a stream named "cube.xml" or any other desired name. Each piece of data that requires a file (e.g. the "add-video" event and the "throw" events) are stored as individual streams and the contents of the original files are copied to their respective streams. The final storage file contains essentially a structured storage "table of contents" section that identifies the offsets within the file to the streams named above followed by the actual data for the streams as in the following example corresponding to the first XML segment above:

```
["cube.xml",0x1000]
["somevideo.wmv",0x2000]
["tomato",0x8000]
[at offset 0x1000, data for cube.xml]
[at offset 0x2000, data for somevideo.wmv]
[at offset 0x8000, data for tomato]
```

Although the "somevideo.wmv" and "tomato" identifiers are used for the reader's convenience in the above example, in practice one would preferably instead use GUIDs generated at runtime to identify the components since, in general, item names are not assured to be unique.

Subsequently, the save process terminates at step 809. As a result of the foregoing process, the structured storage file contains the "cubed" content for the session. Since the entire cube is encapsulated in a single file in an embodiment of the invention, one can use existing methods for transferring the file to other people in that embodiment.

Referring to FIG. 9, a flow chart 900 illustrates a process according to an embodiment of the invention for accessing a memory cube. In step 901, the memory cube icon is activated, such as by a user double-clicking thereon. In step 903, a memory cube viewer is opened. Note that as discussed above, the memory cube may itself be executable, or the operating system may invoke a viewer to view the memory cube as typically occurs when other file types are accessed via their icons.

At step 905, the viewer displays the contents of the memory cube, such as may be dictated by included metadata (e.g. the XML data of the storage file) as discussed above. During this step, the structured storage file is opened (via, for example, StgOpenStorage discussed below) and the "cube.xml" stream is requested. Since this stream has the names of the content streams specified within the XML it is possible to request those further streams at the appropriate time. So, for example, at time "1" the "somevideo.wmv" stream is retrieved from the storage file and added to the playlist. At time "5" the playstate is changed to "play", and at time "30000" the "tomato" stream is retrieved from the storage file and played over the video.

Since, as discussed above, multiple activities can be captured at once, playback of the cube may require extensive computing resources. However some small computing devices such as cell phones, PDAs, etc, have limited viewing capabilities both because of physical (screen/speakers) and computational limitations. To accommodate such limitations, step 905 includes display of a selectable option, in an embodiment of the invention, whereby a user can choose to view the entire session from start to finish or can elect to view activities separately. For example in the playback screen wherein a user is viewing a number of activities such as chat, audio sharing, and photo sharing activities, the user can select an option to pause all but the photo sharing activity to focus on it separately.

If the user orders any manipulation or operation such as scanning through pictures, etc., such commands are executed in step 907. In an embodiment of the invention, the memory cube is opened and then viewed by a group, such as during an online interaction session. Note that in an embodiment of the invention, the allowable operations do not include editing of the cube's contents. However, in an alternative embodiment of the invention, editing is enabled. With respect to either embodiment, regardless of whether the memory cube is editable, the viewer in a further embodiment of the invention allows a user to click on or otherwise select a specific item and save it to their local drive and/or device. For example, a user may wish to save a specific picture or audio file out of the contents of a memory cube.

Finally, at step 909 the user closes the memory cube by exiting the memory cube viewer. In an embodiment of the invention wherein the cube contents are viewed by a group, a further embodiment of the invention allows either the opening/sharing user or any other user to close the cube. The process terminates at step 911.

Creation of and/or access to the structured storage file, i.e. the memory cube file, is by way of the documented IStorage interface in an embodiment of the invention. The compound file implementation of IStorage allows one to create and manage substorages and streams within a storage object residing in a compound file object. To create a compound file object and get an IStorage pointer, the API function StgCreateStorageEx should be called. To open an existing compound file object and get its root IStorage pointer, the API function StgOpenStorageEx should be called.

The IStorage interface supports the following methods: IStorage::CreateStream (Creates and opens a stream object with the specified name contained in this storage object); IStorage::OpenStream (Opens an existing stream object within this storage object using the access modes specified in a grfMode parameter); IStorage::CreateStorage (Creates and opens a new storage object with the specified name in the specified access mode); IStorage::OpenStorage (Opens an existing storage object with the specified name in the specified access mode); IStorage::CopyTo (Copies only the substorages and streams of this open storage object into another storage object); IStorage::MoveElementTo (Copies or moves a substorage or stream from this storage object to another storage object); IStorage::Commit (Ensures that any changes made to a storage object open in transacted mode are reflected in the parent storage); IStorage::Revert (Discards all changes that have been made to the storage object since the last commit operation); IStorage::EnumElements (Creates and retrieves a pointer to an enumerator object that can be used to enumerate the storage and stream objects contained within this storage object); IStorage::DestroyElement (Removes the specified element (substorage or stream) from this storage object); IStorage::RenameElement (Renames the specified substorage or stream in this storage object); IStorage::SetElementTimes (Sets the modification, access, and creation times of the specified storage element); IStorage::SetClass (Assigns the specified CLSID to this storage object); IStorage::SetStateBits (Stores up to 32 bits of state information in this storage object); and IStorage::Stat (Retrieves the STATSTG structure, which contains statistical information, for this open storage object). In an embodiment of the invention, the default implementation of IStorage in the Windows® brand operating system produced by Microsoft® Corporation of Redmond, Wash. is used via its publicly documented StgCreateStorageEx API.

Given the rapid pace of development, it will be appreciated that memory cubes can be created and viewed on any appropriate device, currently known or yet to be developed. For example, a user may wish to view or play back a memory cube in a networked picture frame and/or a TV. Moreover, a user may wish to view the cube on a bracelet, pendant, necklace, or other miniaturized device. In this connection, it will be appreciated that the user input steps described above may be modified as appropriate for the device. For example, a device may lack a cursor, but may be menu driven via a selector button, etc. Moreover, some devices respond to audio commands or commands from one or more peripheral devices. In this manner, photos, audio and/or video could play as a "decoration" of a user's jewelry or clothing. Thus, it is contemplated that the memory cubes have applicability far beyond simply being viewable at a desktop PC or a laptop.

It will be appreciated that an improved system and method for allowing users of online group interaction applications to encapsulate the interaction have been described. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. In addition, the illustrated user interface elements may be modified in arrangement, appearance, content, extent etc. within the invention. Therefore, the invention as described herein contemplates all such embodiments as may come within the scope of the following claims and equivalents thereof.

We claim:

1. A method of preserving materials from an online group interaction session comprising:
   receiving a user command to create a replayable memory file based on a present state of the online group interaction session, wherein the present state of the online group interaction session includes one or more media files, wherein selection of the command by the user is further operable to cause at least one other user interface to be displayed, wherein the at least one other user interface comprises one or more user-selectable options for defining at least one property of the replayable memory file, wherein the at least one property of the replayable memory file comprises which portion of the online session is included in the saved representation;
   creating the replayable memory file comprising the one or more media files, wherein the replayable memory file is represented by a geometric form, and wherein the replayable memory file is viewable when the geometric form is opened, and wherein the replayable memory file comprises media data including audio data or video data;
   while creating the replayable memory file, displaying to the user an animation of an object progressing from an initial state to a final state, wherein the initial state is a flattened representation of the geometric form and the final state is the geometric form; and
   displaying an icon associated with the geometric form, wherein the icon exhibits one or more motional aspects.

2. The method according to claim 1, further comprising receiving a user selection specifying at least one property of the repayable memory file, and wherein the step of creating the replayable memory file further comprises setting the at least one property of the replayable memory file in accordance with the user selection.

3. The method according to claim 2, wherein the at least one property is selected from the group consisting of file icon color and file icon shape.

4. The method according to claim 2, wherein the at least one property is a file icon wrap image.

5. The method according to claim 1, wherein the one or more media files further represent photographs, wherein the photographs have an order in the session, and wherein the step of creating the replayable memory file comprises saving to memory the data of the one or more media files along with a representation of their order in the session.

6. The method according to claim 5, wherein the replayable memory file comprises one or more links referencing the one or more media files.

7. The method according to claim 5, wherein another of the one or more media files represents a collage of the photographs, and wherein creating the replayable memory file further comprises saving to memory data representative of the collage.

8. The method of claim 1, wherein creating the replayable memory file comprises creating an executable file.

9. The method of claim 1, wherein creating the replayable memory file comprises creating a nonexecutable file.

10. The method according to claim 1, wherein the session comprises a series of events, and wherein creating replayable memory file comprises storing in memory a representation of that series of events.

11. The method according to claim 1, wherein the replayable memory file can be view by a user or a group.

12. The method according to claim 1, wherein the replayable memory file can be viewed from the beginning to the end.

13. A computer-readable storage medium having stored thereon computer-executable instructions for performing a method of preserving materials from an online group interaction session, the method comprising the steps of:
- receiving a user command to create a replayable memory file based on a present state of the online group interaction session, wherein the present state of the online group interaction session includes one or more media files, wherein selection of the command by the user is further operable to cause at least one other user interface to be displayed, wherein the at least one other user interface comprises one or more user-selectable options for defining at least one property of the replayable memory file, wherein the at least one property of the replayable memory file comprises which portion of the online session is included in the saved representation;
- creating the replayable memory file comprising the one or more media files, wherein the replayable memory file is represented by a geometric form, and wherein the replayable memory file is viewable when the geometric form is opened, and wherein the replayable memory file comprises media data including audio data or video data;
- while creating the replayable memory file, displaying to the user an animation of an object progressing from an initial state to a final state, wherein the initial state is a flattened representation of the geometric form and the final state is the geometric form; and
- displaying an icon associated with the geometric form, wherein the icon exhibits one or more motional aspects.

14. The computer-readable medium of claim 13, further comprising instructions for receiving a user selection specifying at least one property of the replayable memory file, and wherein the step of creating the replayable memory file further comprises setting the at least one property of the replayable memory file in accordance with the user selection.

15. The computer-readable medium of claim 13, wherein creating the replayable memory file comprises creating an executable file.

16. The computer readable-medium of claim 13, wherein the session comprises a series of events, and wherein creating the replayable memory file comprises storing in memory a representation of that series of events.

17. A computer-readable storage medium having thereon computer-executable instructions for creating a user interface for providing an online group interaction session, the user interface comprising:
- a display region for displaying visual material pursuant to the online group interaction session; and
- a tool bar for displaying at least one tool including a user-selectable memory tool, wherein selection of the memory tool by the user causes a representation of a current state of the online group interaction session to be saved to memory, at which time a progressive animation comprising a folding animation, progressing from an initial state to a final state, wherein the initial state of the animation comprises an image of a substantially flat sheet, wherein the final state of the animation comprises an image of a folded object, is displayed to the user, wherein the representation of the current state of the online group interaction comprises a plurality of images configured to define a geometric form and is viewable when the geometric form is opened by the user, wherein the saved representation comprises media data including audio data or video data, wherein selection of the memory tool by the user is further operable to cause at least one other user interface to be displayed, wherein the at least one other user interface comprises one or more user-selectable options for defining at least one property of the saved representation of the current state of the online group interaction session, wherein the at least one property of the saved representation of the current state of the online group interaction session comprises which portion of the online session is included in the saved representation.

18. The computer-readable medium according to claim 17, wherein causing a representation of the current state of the online group interaction session to be saved to memory comprises saving data representative of each of the plurality of images to memory.

19. The computer-readable medium according to claim 17, wherein the folded object is a container.

20. The computer-readable medium according to claim 19, wherein the container is a box.

21. The computer-readable medium according to claim 17, wherein the at least one property comprises a property of a file icon associated with the saved representation of the current state of the online group interaction session.

22. The computer-readable medium according to claim 17, wherein the at least one property comprises a property of data associated with the saved representation of the current state of the online group interaction session.

* * * * *